(12) United States Patent
Van Wijk et al.

(10) Patent No.: US 12,417,114 B2
(45) Date of Patent: Sep. 16, 2025

(54) POWER MANAGEMENT ON A VEHICLE

(71) Applicant: JAGUAR LAND ROVER LIMITED, Coventry (GB)

(72) Inventors: Gido Van Wijk, Coventry (GB); Devender Sawhney, Coventry (GB); Rudolf Streif, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 153 days.

(21) Appl. No.: 17/905,758

(22) PCT Filed: Mar. 5, 2021

(86) PCT No.: PCT/EP2021/055574
§ 371 (c)(1),
(2) Date: Sep. 6, 2022

(87) PCT Pub. No.: WO2021/176047
PCT Pub. Date: Sep. 10, 2021

(65) Prior Publication Data
US 2024/0192977 A1 Jun. 13, 2024

(30) Foreign Application Priority Data

Mar. 5, 2020 (GB) .................................... 2003200

(51) Int. Cl.
*G06F 9/455* (2018.01)
*G06F 1/3287* (2019.01)

(52) U.S. Cl.
CPC ........ *G06F 9/45558* (2013.01); *G06F 1/3287* (2013.01); *G06F 2009/45575* (2013.01)

(58) Field of Classification Search
None
See application file for complete search history.

(56) References Cited

U.S. PATENT DOCUMENTS

| 6,484,082 B1 * | 11/2002 | Millsap | ............... H04L 12/4035 |
| | | | 701/32.7 |
| 2005/0268078 A1 | 12/2005 | Zimmer et al. | |
| 2009/0300614 A1 * | 12/2009 | Shimogawa | ........ G06F 9/45533 |
| | | | 718/1 |

(Continued)

FOREIGN PATENT DOCUMENTS

WO 2020061805 A1 4/2020

OTHER PUBLICATIONS

Great Britain Intellectual Property Office, Combined Search and Examination Report under Sections 17 and 18(3) Issued in Application No. GB2003200.9, Sep. 7, 2020, 5 pages.

(Continued)

*Primary Examiner* — Charles E Anya
(74) *Attorney, Agent, or Firm* — McCoy Russell LLP

(57) ABSTRACT

A vehicle controller can include a hypervisor for controlling a power state of the vehicle controller, the vehicle controller comprising at least two virtual machines hosted on the vehicle controller. The hypervisor is configured to: receive an active status indication from at least one virtual machine; determine, in dependence on the active status indication, if at least one virtual machine is active; and inhibit a reduced power state of the vehicle controller if the hypervisor determines that at least one virtual machine is active.

17 Claims, 6 Drawing Sheets

(56) References Cited

U.S. PATENT DOCUMENTS

| | | | |
|---|---|---|---|
| 2010/0070725 A1* | 3/2010 | Prahlad | G06F 11/1453 |
| | | | 718/1 |
| 2010/0218014 A1* | 8/2010 | Bozek | G06F 9/5077 |
| | | | 713/320 |
| 2011/0055602 A1 | 3/2011 | Kamay et al. | |
| 2011/0055830 A1 | 3/2011 | Kamay et al. | |
| 2011/0196968 A1* | 8/2011 | Kobayashi | G06F 9/5077 |
| | | | 709/226 |
| 2011/0213997 A1* | 9/2011 | Kansal | G06F 1/3206 |
| | | | 713/340 |
| 2012/0030670 A1* | 2/2012 | Vijay | G06F 11/0757 |
| | | | 718/1 |
| 2014/0289549 A1* | 9/2014 | Bailey | G06F 1/3296 |
| | | | 713/320 |
| 2014/0380069 A1* | 12/2014 | Berke | G06F 1/32 |
| | | | 713/320 |
| 2015/0040122 A1* | 2/2015 | Singleton, IV | G06F 9/5077 |
| | | | 718/1 |
| 2016/0127509 A1* | 5/2016 | Uriel | G06F 9/45558 |
| | | | 709/203 |
| 2016/0134584 A1* | 5/2016 | Lang | H04L 61/5014 |
| | | | 709/220 |
| 2016/0246341 A1 | 8/2016 | Burrell et al. | |
| 2016/0371110 A1* | 12/2016 | Radhakrishnan | G06F 11/07 |
| 2018/0095855 A1* | 4/2018 | Sanakkayala | G06F 11/3006 |
| 2018/0293067 A1* | 10/2018 | Hirshberg | G06F 8/656 |
| 2019/0317751 A1 | 10/2019 | Ramsay et al. | |
| 2020/0125157 A1* | 4/2020 | Kachare | G06F 3/0679 |

OTHER PUBLICATIONS

ISA European Patent Office, International Search Report and Written Opinion Issued in Application No. PCT/EP2021/055574, Jun. 4, 2021, WIPO, 12 pages.

* cited by examiner

POWER MANAGEMENT ON A VEHICLE

CROSS REFERENCE TO RELATED APPLICATIONS

The present application is a U.S. National Phase of International Application No. PCT/EP2021/055574 entitled "POWER MANAGEMENT ON A VEHICLE," and filed on Mar. 5, 2021. International Application No. PCT/EP2021/055574 claims priority to Great Britain Patent Application No. 2003200.9 filed on Mar. 5, 2020. The entire contents of each of the above-listed applications are hereby incorporated by reference for all purposes.

TECHNICAL FIELD

The present disclosure relates to power management on a vehicle. Aspects of the invention relate to a hypervisor for controlling the power state of a vehicle controller, to a vehicle controller, to a vehicle, and to a method of controlling the power state of a vehicle.

BACKGROUND AND SUMMARY

Traditional automotive electronic control units (ECUs) only have a single software system or feature-set running and operating in-sync with the vehicle. For example, chassis control system, body-control module, powertrain etc. are all directly operating hardware systems in the vehicle. For most of these ECUs, the power management strategy is fairly straightforward: when the vehicle is ON, the ECU should be up & running; when the vehicle is OFF, the ECU should be down, with potentially different operating modes depending on the vehicle Power Mode (PM) for the more advanced ECUs.

Modern vehicles however are becoming increasingly connected and have ever increasing amounts of computational power within their on-board vehicle control systems. For example, the main vehicle controller may have 25 GB or more of memory that is used by the main system software.

Within such a vehicle controller, functionality equivalent to several standalone ECUs may be hosted in virtual machines (VMs) running on a hypervisor, the operating software, on the vehicle controller.

Such a "multi-ECU" vehicle controller may host a number of different virtual machines having a number of different software implemented ECUs, such as the vehicle telematics control unit, a software over the air (SOTA) control unit, a vehicle diagnostics control unit and others. The telematics, SOTA and diagnostics control units may be hosted in different virtual machines which makes power management needs complex. For example, the telematics control unit offers remote features to the vehicle driver and so should be "always on" since it will only be able to respond when it is "ON".

Applications running on other virtual machines may have different power management needs from each other and from the telematics stack. Since the telematics stack is linked to remote driver functionality it will be treated as the "master" unit and thus could introduce power management issues for the other virtual machines and the applications running thereon. For example, the telematics stack could request the vehicle controller to go in "Listen" mode, which suspends the Telematics VM but shuts down the other virtual machines (VMs). In this scenario, the other VMs may be shut down while they are executing critical code, such as file system operations, or in the case of SOTA, an update package download.

For the above reasons, a "multi-ECU" vehicle control system requires a different power management strategy than more traditional ECUs. It needs to support power management services for several components at the same time and needs to have a "stand-by" power mode for the Telematics stack.

It is an aim of the present invention to address one or more of the disadvantages associated with the prior art.

Aspects and embodiments of the invention provide a hypervisor for controlling the power state of a vehicle controller, to a vehicle controller, to a vehicle, and to a method of controlling the power state of a vehicle controller.

According to an aspect of the present invention there is provided a hypervisor for controlling a power state of a vehicle controller, the vehicle controller comprising at least two virtual machines hosted on the vehicle controller, the hypervisor configured to: receive an active status indication from at least one virtual machine; determine, in dependence on the active status indication, if at least one virtual machine is active; and inhibit a reduced power state of the vehicle controller if the hypervisor determines that at least one virtual machine is active.

The present invention provides a hypervisor that is configured to receive active status indications from the virtual machines hosted on the vehicle controller. Such active status indications may take the form of power requirement messages that indicate to the hypervisor that virtual machines (or applications running on the virtual machines) require power, e.g. to complete a critical task or to download a software update. By this mechanism the hypervisor can inhibit the vehicle controller entering a reduced power state until such time as the virtual machine (or applications within the virtual machine) have completed the tasks for which they require power.

The hypervisor may comprise a power manager wherein the power manager is configured to output a power state control signal to change the power state of the vehicle controller. The virtual machine manager and power manager may together be responsible for the power status of the virtual machines and the control of the power state of the vehicle control system. The virtual machine manager and power manager may take the form of software programs running within the hypervisor. Alternatively, they may be software based electronic control units running on the hypervisor.

The virtual machine manager may be configured, when at least one of the virtual machines requires power, to output a power requirement signal to the power manager to inhibit the power manager from outputting the power state control signal to change the power state of the vehicle controller.

The active status indication may comprise a virtual machine identifier. This allows the hypervisor to keep track of which virtual machines (or applications within virtual machines) have sent indications indicating that they have an active status.

The virtual machine manager may comprise a power status counter. Further, the power status counter may comprise at least two power status counter values such that each power status counter value corresponds to a virtual machine hosted on the vehicle controller. In this way the virtual machine manager may keep track of active status indications received from the various virtual machines within the controller. For example, for a virtual machine that hosts multiple different applications (which may be unaware of the existence of each other and may even have been developed by different developers), a first application within the virtual machine may send an active status indication and the virtual machine manager may increase the power status counter value for that virtual machine by a first increment (e.g. "0" to "1"). A second application within the virtual machine may then send an active status indication and the power status counter value could be increased by a further increment (e.g. "1" to "2"). While the power status counter value remains above a datum value (in this case "0") the virtual machine manager knows that there is at least one application within that virtual machine that requires power to remain in an active status and consequently can inhibit the controller from entering a reduced power state. The power status counter value may therefore be altered for the at least one virtual machine that has sent the active status indication.

The active status indication comprises a positive power requirement message from one of the virtual machines and the power status counter value for that virtual machine may be configured to be increased in response to the positive power requirement message.

The active status indication may comprise a negative power requirement message from one of the virtual machines and the power status counter value for that virtual machine may be configured to be decreased in response to the negative power requirement message.

The active status indication may be a keep alive request generated by one of the virtual machines to indicate to the hypervisor that the virtual machine requires power.

The hypervisor may be configured to initiate a timer upon receipt of an active status indication from the at least one virtual machine and wherein the hypervisor may be configured to alter the power status counter value for the at least one virtual machine in dependence on the timer. In this manner when the hypervisor receives a keep alive request a time may be started (e.g. a timer sequence may be started either counting up to a predetermined value or counting down to zero) and at the end of timer sequence the power status counter value could be altered (e.g. reset to the datum value). This avoids the vehicle controller being left stuck in a powered on state because, for example, a virtual machine has not cancelled a keep alive request. The timer may therefore be configured to reset the power status counter value to a datum point at the expiry of the timer.

The hypervisor may be configured to receive a shut-down request signal to change the power state of the vehicle controller from an ON state to a reduced power state and wherein the hypervisor is configured to output a power state control signal to transition the vehicle controller from the ON state to the reduced power state when the hypervisor determines that none of the virtual machines require power. The reduced power state may be one in which virtual machines are suspended or powered off.

Each virtual machine may comprise a plurality of applications, each application being configured to send active status indications.

According to another aspect of the present invention there is provided a vehicle controller comprising a hypervisor according to the above aspect of the present invention. The vehicle controller may comprise: at least one electronic processor having an electrical input for receiving the active status indication; and at least one memory device electrically coupled to the at least one electronic processor and having instructions stored therein; and wherein the at least one electronic processor may be configured to access the at least one memory device and execute the instructions thereon so as to inhibit a reduced power state of the vehicle controller if the hypervisor determines that at least one virtual machine is active.

According to another aspect of the present invention, there is provided a vehicle comprising a controller in accordance with any one of the aforementioned aspects and embodiments.

According to a further aspect of the present invention there is provided a method of controlling a power state of a vehicle controller, the vehicle controller comprising at least two virtual machines hosted on the vehicle controller, the method comprising: receiving an active status indication from at least one virtual machine; determining, in dependence on the active status indication, if at least one virtual machine is active; and inhibiting a reduced power state of the vehicle controller if the hypervisor determines that at least one virtual machine is active.

The method may comprise determining which virtual machine sent the active status indication and varying a power status counter value corresponding to the virtual machine in response to receiving the power requirement message.

The method may further comprise determining if any of the virtual machines require power by comparing the power status counter value with a datum point.

The method may comprise starting a timer upon receipt of the active status indication and altering the power status counter value in dependence on the timer. The power status counter value may be reset to the datum point at the expiry of the timer.

The method may comprise receiving a shut-down request signal to change the power state of the vehicle controller from an ON state to the reduced power state (e.g. a suspended state or an off state) and wherein the method may comprise outputting a power state control signal to transition the vehicle controller from the ON state to the reduced power state when it is determined that none of the virtual machines require power.

According to a yet further aspect of the present invention there is provided a non-transitory computer readable medium comprising computer readable instructions that, when executed by a processor, cause performance of the method of any one of the aforementioned aspects and embodiments.

The invention may extend to a vehicle comprising a vehicle control system comprising one or more vehicle controllers, the vehicle controllers comprising multiple "software" ECUs hosted on a plurality of virtual machines overseen by the hypervisor running on the controller. The invention may therefore extend to a vehicle control system, and to a method of changing a global power state of a vehicle control system.

The vehicle control system may comprise one or more controllers, the vehicle control system comprising a global power state and comprising at least two virtual machines being hosted on the one or more controllers wherein each virtual machine has a local power state, the vehicle control system being configured to: receive a vehicle parameter signal indicative of a required global power state of the vehicle control system; and determine a local power state for each virtual machine in dependence on the received vehicle parameter signal; update a current local power state of each virtual machine to the respective determined local power state therefor.

The present invention may further provide a vehicle control system having a global power state (e.g. normal, lower power, sleep) and at least two virtual machines each of which has a local power state. Upon receiving a vehicle parameter power signal which could be a signal indicating the state of a vehicle CAN bus, vehicle battery voltage, an input from one of the virtual machines or a signal from outside the vehicle received via a modem, the vehicle control system may be arranged to determine the local power state of each virtual machine on the basis of the received vehicle parameter signal and to update the local power state accordingly. In this manner the virtual machines may be placed into an appropriate power state as the global state of the vehicle changes. It is noted that the vehicle parameter signal may also represent a passive determination that the vehicle system is on or off by monitoring the vehicle CAN. It is further noted that the vehicle parameter signal may not necessarily require a power state change to occur but could represent a reconfirmation of state.

The one or more controllers may collectively comprise: at least one electronic processor having an electrical input for receiving the vehicle parameter signal indicative of the required global power state of the vehicle control system; and at least one memory device electrically coupled to the at least one electronic processor and having instructions stored therein; and wherein the at least one electronic processor may be configured to access the at least one memory device and execute the instructions thereon so as to determine a local power state for each virtual machine in dependence on the received vehicle parameter signal.

The processor may comprise an output configured to output a first output signal to the virtual machines to update the current local power state of each virtual machine to the respective determined local power state therefor; and output a second output signal to update a current global power state of the vehicle control system to the required global power state.

The processor may comprise a virtual machine manager configured to output the first output signal. The processor may comprise a power manager and the virtual machine manager may be configured to notify the power manager when the at least two virtual machines are in the determined local power state. The power manager may be configured to output the second output signal to transition the vehicle controller to the required global power state. The power manager may be configured to output the second output signal after the virtual machine manager notifies the power manager that the virtual machines are in the determined local power state.

The power manager may be configured to receive the vehicle parameter signal and to send a global power state signal to the virtual machine manager indicating the required global power state. The virtual machine manager may comprise a configuration file that maps the local power state of each virtual machine to a global power state of the vehicle control system and wherein the virtual machine manager is configured to determine the local power state of each virtual machine based on the received global power state signal.

Each virtual machine may comprise a power management service and the power management service may be configured to receive the vehicle parameter signal. The power management service may be configured to send a local power state request to the power manager. The power manager may be configured to transmit the local power state request to the virtual machine manager.

The virtual machine manager may be configured to update the local power state of the virtual machines that have not raised a local power state request in response to receiving the vehicle parameter signal.

One of the virtual machines may be a telematics control unit. The local power state request may be a request to prevent the telematics control unit transitioning to a shut-down local power state. The telematics control unit may be configured to send the local power state request when the global power state is being updated from an ON state, in which all of the virtual machines are active, to a LISTEN state in which the telematics control unit is active or suspended.

The processor may comprise a timer, wherein the timer may be configured to be started when the global power state is updated to the LISTEN state and wherein the processor may be configured to update the global power state to a SLEEP state, in which the telematics control unit is shut-down, at the expiry of the timer.

The vehicle parameter signal may be indicative of at least one of: a CAN state, a vehicle battery voltage, a modem communication and a request from a virtual machine.

The local power state of each of the two or more virtual machines may be any one of: active, shut-down or suspended.

The processor may be configured to determine the new global power state in dependence on the received vehicle parameter signal.

A method of changing a global power state of a vehicle control system may be provided comprising one or more controllers and at least two virtual machines hosted on one of the controllers wherein each virtual machine has a local power state, the method may comprise: receiving a vehicle parameter signal indicative of a required global power state of the vehicle control system; determining, based on the received vehicle parameter signal, a local power state for each virtual machine in dependence on the received vehicle parameter signal; updating a current local power state of each virtual machine to the respective determined local power state therefor.

The method may comprise updating a current global power state of the vehicle control system to the required global power state. The method may comprise receiving a local power state request from a virtual machine and may comprise maintaining the virtual machine in the local power state in response to the local power state request.

There may be provided a non-transitory computer readable medium comprising computer readable instructions that, when executed by a processor, cause performance of the method of any one of the aforementioned aspects and embodiments.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the invention will now be described, by way of example only, with reference to the accompanying drawings, in which.

DETAILED DESCRIPTION

In general terms embodiments of the invention relate to a vehicle control system and methods of operating a vehicle control system that provide improved power management functionality.

Figure 1:
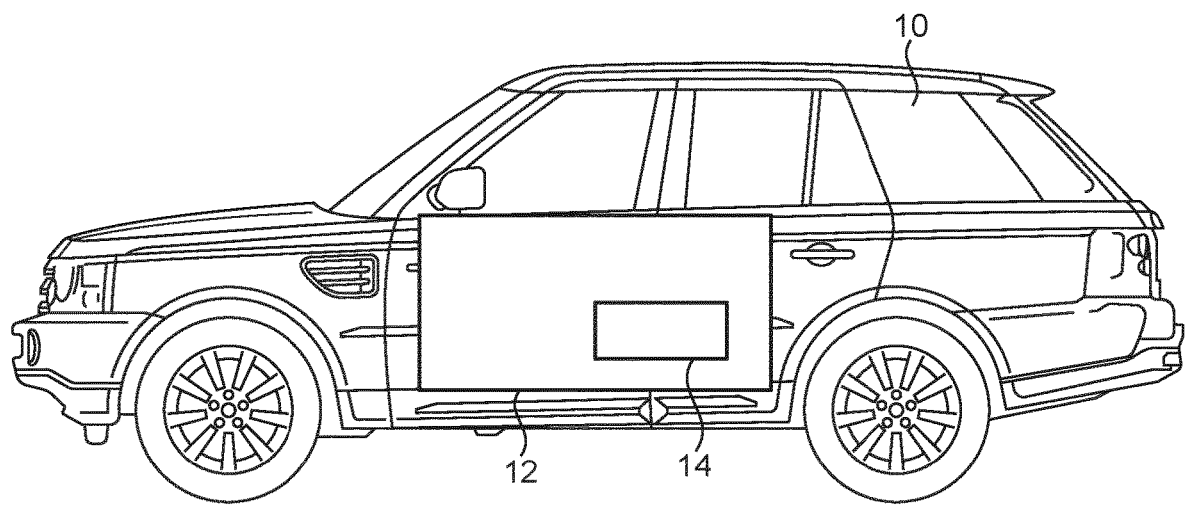
FIG. 1 shows a vehicle comprising a vehicle control system according to an embodiment of the invention.

To place embodiments of the invention in a suitable context reference will firstly be made to FIG. 1 which shows a vehicle 10 comprising a vehicle control system 12 comprising one or more vehicle controllers 14 (for clarity only one controller is shown in FIG. 1). As described in relation to FIGS. 2 to 7 the vehicle control system 12 may comprises a vehicle controller 14 (also referred to herein as a vehicle domain controller) that comprises multiple "software" ECUs hosted on a plurality of virtual machines overseen by a hypervisor running on the controller 14. The vehicle controller 14 and the vehicle control system 12 that the controller is part of represents a multi-ECU system in which the management of power requirements to different applications (e.g. telematics, SOTA, diagnostics) running on the various virtual machines is multifaceted.

Figure 2:
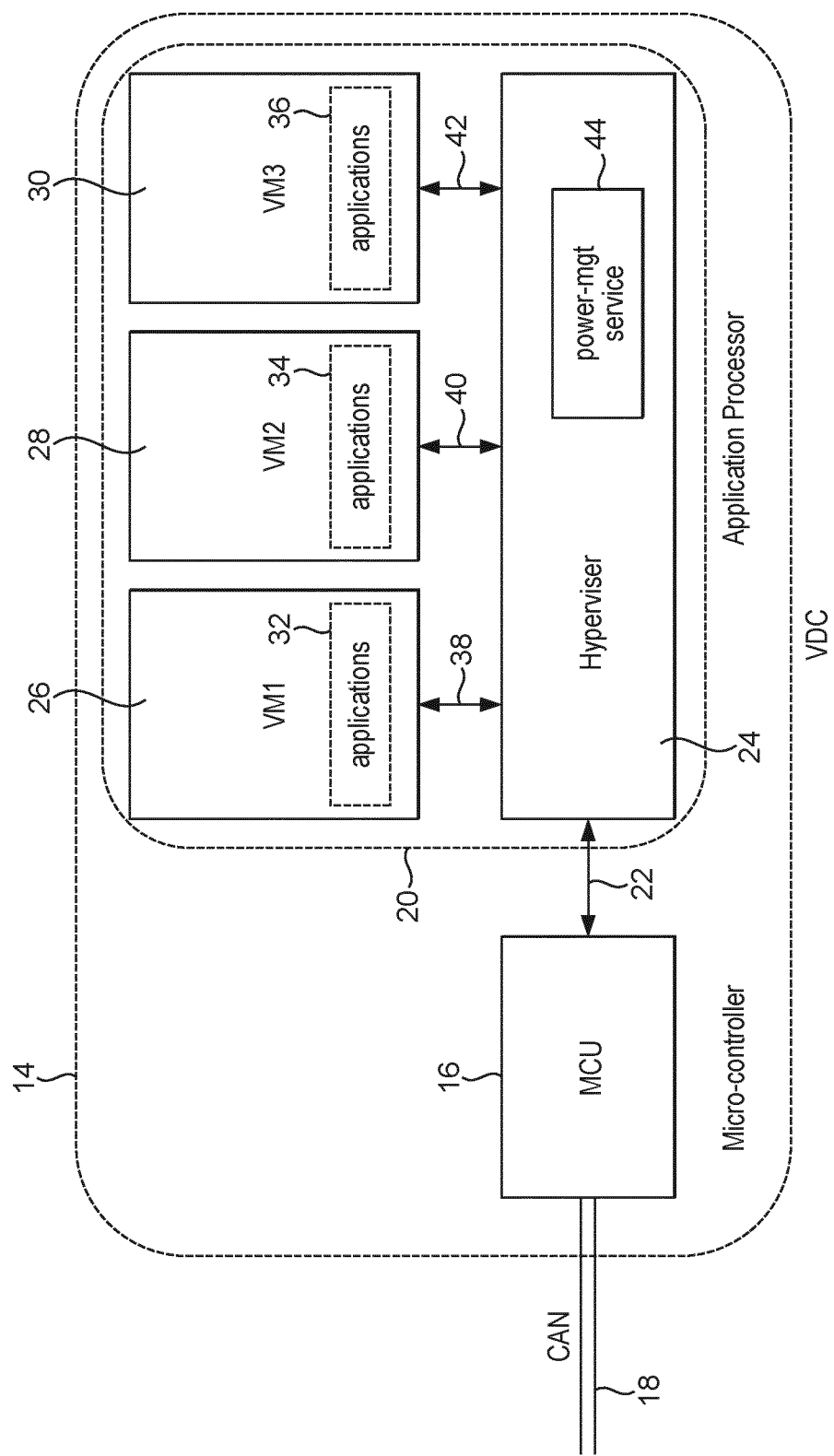
FIG. 2 shows a schematic diagram of vehicle controller in accordance with embodiments of the invention.

FIG. 2 shows a schematic diagram of a vehicle controller 14 in accordance with an embodiment of the present invention. The vehicle controller 14 hardware comprises a microcontroller unit 16 which runs basic hardware power management, and in the illustrated embodiment the controller area network (CAN) stack 18. The vehicle controller 14 further comprises an application processor 20 which hosts the various "software" ECUs. The MCU 16 and application processor 20 are in communication 22 with each other (see FIG. 6 and the discussion of the operation of the power manager 48 and virtual machine manager 46 below).

The application processor 20 runs a hypervisor 24 which in turn hosts three virtual machines 26, 28, 30. Each virtual machine (VM) has one or more applications 32, 34, 36 that runs on it. Each virtual machine 26, 28, 30 is in communication 38, 40, 42 with a power management service 44 that runs on the hypervisor 24.

The virtual machines 26, 28, 30 run different software ECUs, e.g. telematics, software over the air (SOTA) and diagnostics. These virtual machines and the applications running thereon have different power management needs.

For example, telematics is a unit that should be "always on" (unless the vehicle is in "sleep" mode as discussed below) in order to provide remote features to the vehicle user and the power states of the individual virtual machines could be "running", "shutdown" or "suspended". The telematics unit may be treated as having overall control within the power management design of the vehicle controller 14, whereby if the telematics unit requests the vehicle controller 14 to go to a new power state while other applications on other virtual machines running on the vehicle controller 14 are in the middle of a process (e.g. executing critical code such as file system operations or, in the case of the SOTA unit, downloading an update package) this could cause applications to crash.

The power management service 44 according to embodiments of the present invention is configured to provide "keep alive" functionality to the applications running on the virtual machines to mitigate against applications crashing while avoiding leaving the vehicle controller 14 in a fully running power state indefinitely.

Figure 3:
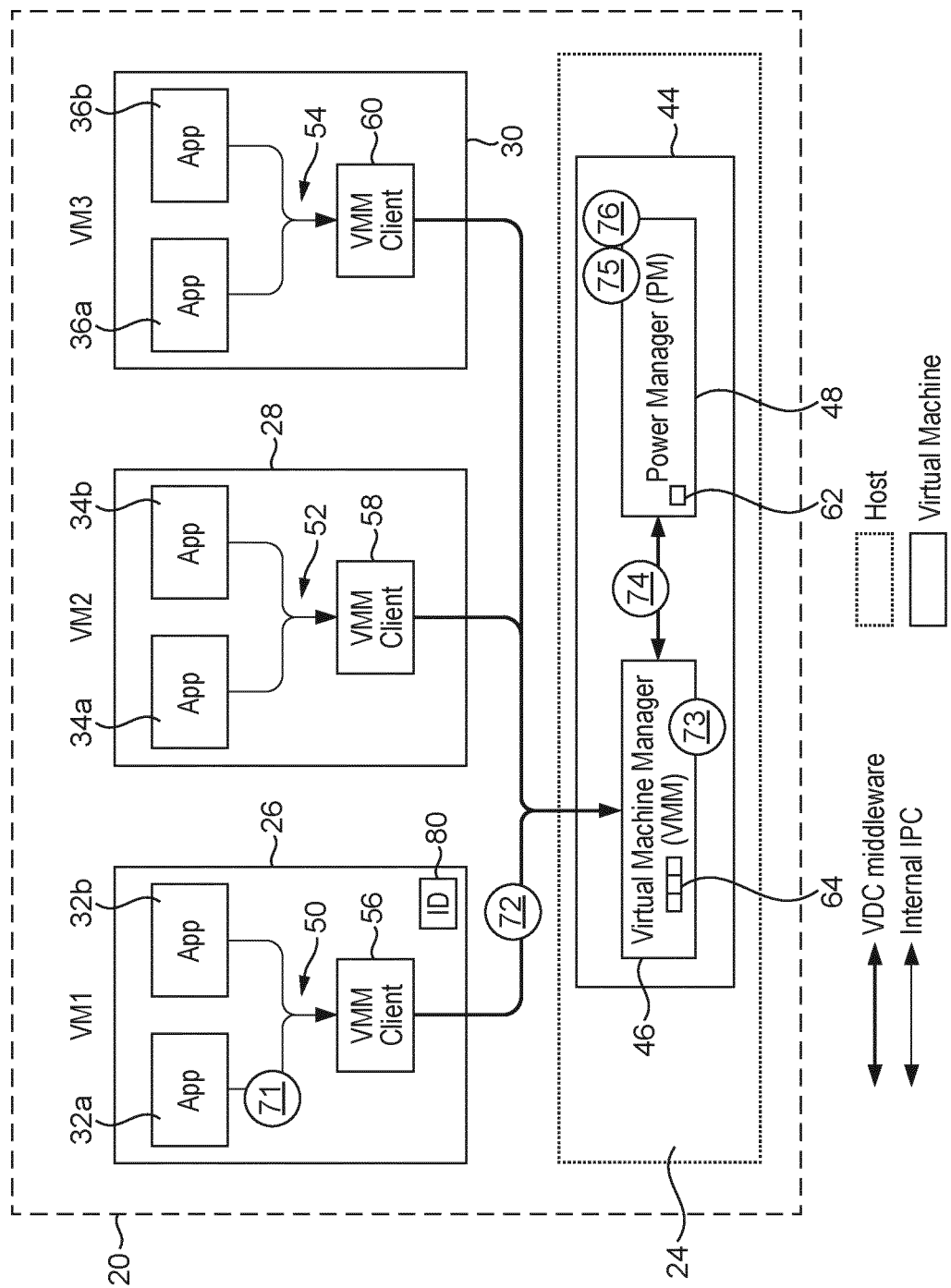
FIG. 3 shows a schematic view of a processor of the vehicle controller of FIG. 2 in more detail.

A more detailed schematic of the application processor 20 is provided in FIG. 3 in which it can be seen that the power management service 44 comprises two processes, a virtual machine manager (VMM) 46 and a power manager 48, each of which handle different parts of the vehicle controller 14 power management.

It is noted that although two processes 46, 48 are shown in FIG. 3, in an alternative configuration the power management service 44 may comprise a single process that handles all the functionality discussed herein relating to the virtual machine manager 46 and power manager 48.

The virtual machine manager 46 is responsible for the lifecycle of the virtual machines 26, 28, 30 and is arranged to monitor the power state of the virtual machines. The virtual machine manager 46 is further configured to be able to start and stop the virtual machines and to ensure they are running correctly at any given time. Further details on the functionality of the virtual machine manager 46 is provided below. Additionally, however, the virtual machine manager 46 manages a "keep alive" mechanism, in accordance with embodiments of the present invention, within the vehicle control system 12 that mitigates against applications crashing as the power states of the virtual machines are changed (e.g. when the telematics unit requests a power state change).

As shown in FIG. 3, each of the virtual machines 26, 28, 30 comprises two applications running thereon (applications 32a, 32b in virtual machine 26, applications 34a, 34b in virtual machine 28 and applications 36a, 36b in virtual machine 30). It is however noted that the virtual machines may comprise more or fewer applications than those depicted. Examples of applications that may be hosted on a virtual machine include, but are not limited to: telematics applications such as emergency/breakdown call, logistics tracking, stolen vehicle tracking, remote vehicle control; software over the air (SOTA) applications such as Vehicle Update Controller, embedded on-board diagnostics, update package download; Diagnostics applications such as a diagnostics over IP (DoIP—standardized) server, unified diagnostics services (UDS—standardized) handler.

Within each virtual machine, each application is in communication with a virtual machine manager client (VMM client) via an inter process communication path (IPC paths 50, 52, 54). Applications 32a, 32b are therefore in communication with VMM client 56, applications 34a, 34b are in communication with VMM client 58 and applications 36a, 36b are in communication with VMM client 60.

The VMM clients 56, 58, 60 are in communication via middleware with the virtual machine manager 46 within the power management system 44.

The VMM clients 56, 58, 60 send periodic signals ("heartbeats") to the VMM 46 to indicate operational conditions of the applications within their respect virtual machines 26, 28, 30. As discussed below the VMM clients 56, 58, 60 enable applications within the virtual machines to register power requirement requests with the virtual machine manager 46, e.g. a request to maintain power (a "keep alive" request) or an indication that an application no longer needs to maintain power (because it has completed whatever tasks it was running). The power manager 48 and virtual machine manager 46 utilise a timer 62 and counter 64 as described in more detail below to keep track of power requirement requests from the virtual machines.

Figure 4:
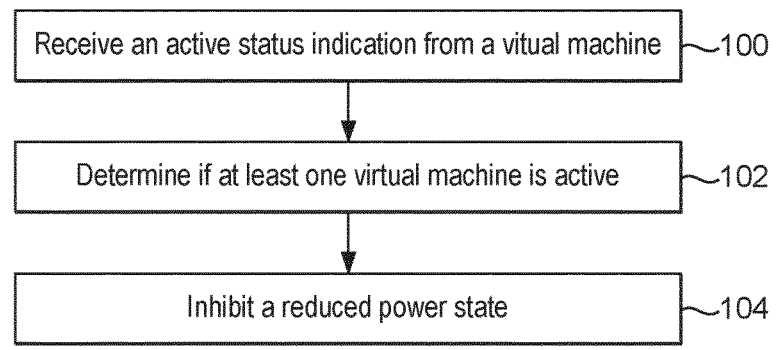
FIG. 4 shows a flow chart outlining the method steps of controlling the power state of a controller according to embodiments of the invention.

FIG. 4 is a flow chart of a method of controlling the power state of a vehicle controller 14 in accordance with embodiments of the present invention.

In step 100 the hypervisor 24 (e.g. the virtual machine manager 46 within the hypervisor) receives an active status indication from at least one virtual machine. The active status indication that is received comprises information of the power management requirements of the applications running on the virtual machine that the indication has been received from, e.g. the active status indication may indicate that an application running on the virtual machine that has sent the indication requires power. Such an indication may be sent periodically or may be sent in response to the power management service 44 sending a communication indicating that the power state of the vehicle controller 14 is about to change. Applications running on the virtual machines may send such indications because they are in a critical state such as in the middle of executing critical code or in the middle of a software update, because they require additional time for some reason before a power state of the controller changes or for other reasons. Such an active status indication may take the form of a power requirement message and may be referred to herein as a "keep alive" message where an application has sent an indication that it needs to maintain power for a period (e.g. because it is part way through a process). The active status indication may however be an indication that an application, that had previous sent a "keep alive" message, now no longer requires power (e.g. because it has completed the process that it was running).

In step 102 the hypervisor determines in dependence on the active status indication received in step 100 a power requirement of the at least one virtual machine. This step may comprise referring to a power status counter that keeps track of all requests from the virtual machines to maintain power. The power status counter is described in more detail below in relation to FIG. 5.

In step 104, if the hypervisor determines that at least one virtual machine requires power, then it inhibits the vehicle controller 14 from entering a reduced power state. This determination that at least one virtual machine requires power may initiate the start of a timer 62 (shown in FIG. 3) to track the time from the determination being made. The timer may be provided to enable the hypervisor with a timeout mechanism. In this way the hypervisor may avoid being stuck in a state in which it cannot shutdown because a virtual machine has not cancelled a "keep alive" request.

In more detail, and in conjunction with FIG. 3, the process of controlling the power state of a vehicle controller 14 in accordance with embodiments of the present invention is now described.

Within the hypervisor 24, the power manager 48 manages the control of the power state of the vehicle controller 14. It is noted that in the following description the active status indications relating to a positive power requirement request are referred to as "keep alive" messages.

The virtual machine manager 46 is responsible for the virtual machines (26, 28, 30) and keeps track of what virtual machine has requested power via a keep alive message.

The virtual machine manager 46 keeps track of power requirement messages received from the virtual machines via the counter 64. It is noted that within the counter 64 the virtual machine manager 46 maintains a counter value (shown in FIG. 5) in respect of each virtual machine (26, 28, 30). As described below the virtual machine manager 46 will increase/decrease the counter value for each virtual machine so that several applications within a particular virtual machine can request a positive power requirement without interfering with each other.

An example of the steps that the virtual machine manager 46 may follow if applications 32a and 32b within virtual machine 26 both send positive power requirement messages (a "keep alive" message) and subsequent negative power requirement messages (i.e. they cancel or clear their keep alive messages) may be as follows:

application 32a sends a first keep alive message via the virtual machine client 56 to the virtual machine manager 46. In response, the virtual machine manager 46 increments a keep alive counter value for virtual machine 26 to "1";

application 32b then sends a second keep alive message via the virtual machine client 56 to the virtual machine manager 46. In response the virtual machine manager 46 increments the keep alive counter value for virtual machine 26 to "2";

application 32a then clears the first keep alive message by sending an active status indication in the form of a negative power requirement message via the virtual machine client 56 to the virtual machine manager 46. The application 32a may send this message because, for example it has finished the task/process that caused it to send the keep alive message. In response to receiving the negative power requirement message, the virtual machine manager 46 decrements the counter value for virtual machine 26 to "1";

application 32b then clears the second keep alive message by sending a negative power requirement message via the virtual machine client 56 to the virtual machine manager 46. In response to receiving the negative power requirement message, the virtual machine manager 46 decrements the counter value for virtual machine 26 to "0".

In order to avoid the vehicle controller 14 being stuck in a state in which it is inhibited from being shutdown because a virtual machine has not cancelled a "keep alive" request, a timer is provided to enable a power state to be triggered on expiry of the timer. This mechanism ensures the vehicle controller 14 does not become deadlocked.

The timer 62 is shown in FIG. 3 as being within the power manager 48. It is also appreciated that the timer 62 may be provided within the virtual machine manager 46.

Including the action of the timer 62, the process of controlling the power state of the controller 14 is as follows:

1) Communication 71—initially, the application 32a sends, over the inter process communication path 50 an active status indication (in the form of a "Keep Alive" request/positive power requirement message) to the VMM client 56 within the virtual machine 26.

2) Communication 72—the virtual machine manager client 56 then forwards the keep alive request along with an identifier 80 of the virtual machine 56 to the virtual machine manager 46. This request is forwarded over the controller middleware.

3) Upon receiving the forwarded Keep Alive request, the VMM 46 increases the counter value (for that virtual machine identifier 80) within the counter 64.
4) The VMM 46 then forwards the Keep Alive request to the host Power Manager 48. This keep alive request is effectively a power requirement signal that is sent from the virtual machine manager 46 to the power manager 48 to inhibit the power manager from entering a reduced power state.
5) The power manager 48 then updates its internal state machine with a Keep Alive flag.

6) A configurable timer 62 is then started within the power manager 48 that will force the Keep Alive flag to be cleared upon timeout of the timer 62 such that the power state of the controller 14 can be changed. It is noted that the timeout period may be set to a period of a few seconds. In an alternative embodiment, as an alternative to clearing the Keep Alive flag and enabling the power state of the controller 14 to be changed at the end of the timer period, the virtual machine manager 46 could be arranged to send a message back to those applications that have submitted a Keep Alive request asking them to confirm if they still require power. In this manner an application that still requires power can reaffirm the Keep Alive request that they previously sent.

Figure 5:
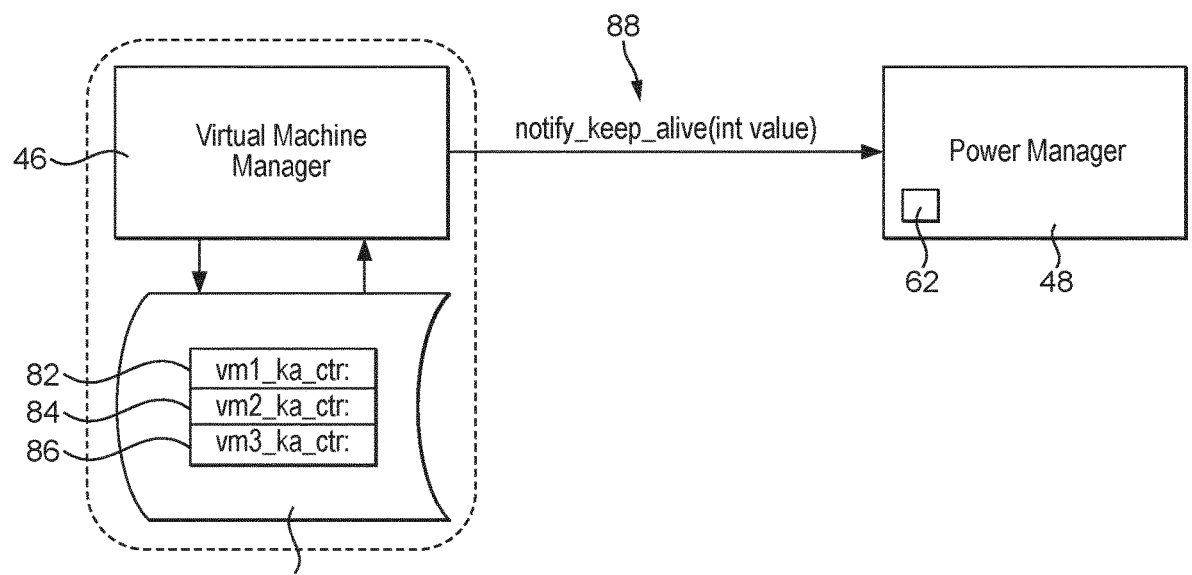
FIG. 5 shows a view of components of the vehicle controller of FIGS. 2 and 3 in more detail.

FIG. 5 shows the counter 64 within the virtual machine manager 46 in more detail. The counter comprises counter values 82, 84, 86 for the virtual machines 26, 28, 30 respectively. As described above, the virtual machine manager 46 stores the counter value for each virtual machine in memory. The power manager 48 provides a single interface to the virtual machine manager (a power requirement signal in the form of a notification value "notify_keep_alive" (88)) which only takes one argument—either 1 or 0. The power manager 48 does not need to know which virtual machine 26, 28, 40 has sent the Keep Alive request, but only if a Keep Alive is on-going. In other words, if any of the counter values (82, 84, 86) are non-zero then one or more application (32a, 32b, 34a, 34b, 36a, 36b) has sent a Keep Alive request and so the notification value 88 is set to "1". A notification value of "0" means no application requires power and the power management service 44 is able to make a global power state change within the controller 14 as described below.

Figure 6:
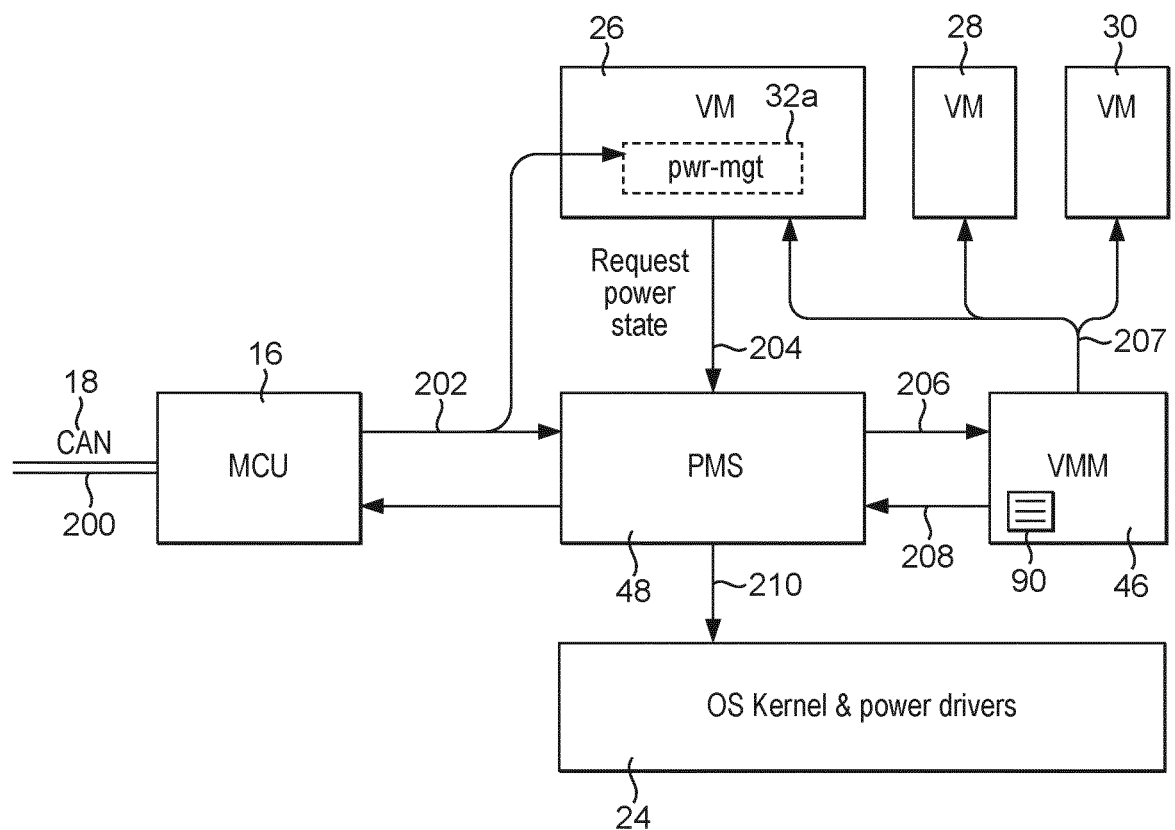
FIG. 6 shows a further schematic diagram of vehicle controller in accordance with embodiments of the invention.
Figure 7:
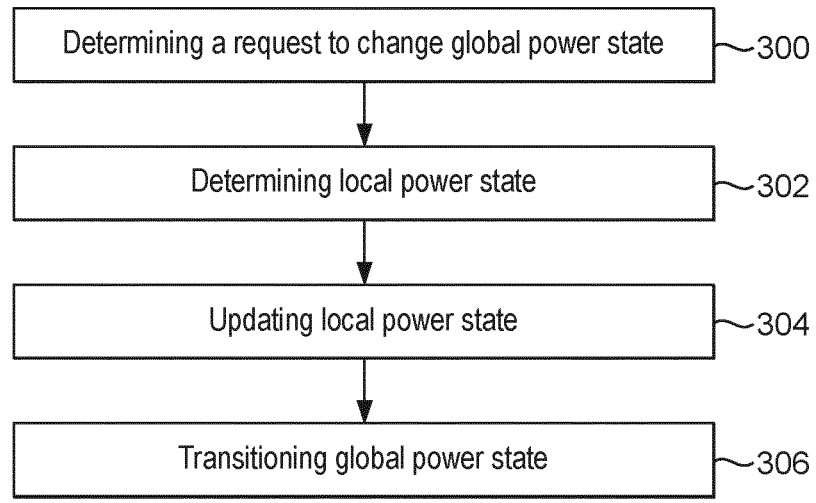
FIG. 7 shows a flow chart outlining the method steps of changing the global power state of a vehicle controller according to embodiments of the invention.

The operation of the power manager 48 and virtual machine manager 46 in transitioning the controller 14 between global power states is now described in combination with FIGS. 6 and 7.

It is noted that the vehicle controller 14 may have a number of global power states (in the table below these are "normal", "low power", "listen" and "sleep") and for each of these global power states the virtual machines may be in different states (i.e. different local power states).

The global power state and associated local power states that the virtual machines 26, 28, 30 may take are represented in the table below. In the table it is assumed that the virtual machine 26 is a telematics unit.

TABLE 1

| Power State | Description | VM state |
|---|---|---|
| NORMAL | This is the default power state. The vehicle controller is in this power state when the vehicle is being driven. In this power state, all VMs and applications are up and running | All VMs active |
| LOW_POWER | This is a power state where only Telematics is running to reduce power consumption. Also the processing power is drastically reduced. | Telematics only running |
| LISTEN | In this power state, the vehicle controller is suspended to RAM. SOTA & standard apps VMs are shut down, Telematics is kept suspended | Telematics suspended, other VMs down |
| SLEEP | The least power hungry state. In Sleep mode, the VDC is shut down | All shut down |

Power Manager

The power manager 48 within the power management service 44 is configured to be responsible for the different power states of the vehicle controller 14—meaning that it is arranged to receive all signals required for power management and that it is configured to select and make a power state transition when all conditions are met.

The power manager 48 is arranged to monitor for several inputs or vehicle parameter signals such as the CAN bus state, the vehicle battery voltage, modem communication, input from the virtual machines (Note: the power manager provides an interface for the applications in the virtual machines to request a new power state).

An overview of an example of the process of making a global power state change to the controller 14 in response to a trigger based on the CAN state is as follows:

1) It is noted that the main trigger for a global power state transition of the controller 14 is the CAN state (see vehicle parameter signal 200 in FIG. 6).
   a. When the CAN bus 18 is active, it means the vehicle is active and the vehicle controller 14 should be fully operational. In that case, the vehicle controller is in the "normal" state and all virtual machines (26, 28, 40) are active.
   b. When the CAN bus is turned off (e.g. when the vehicle ignition is turned off), through CAN network management, the vehicle controller microcontroller unit (MCU) 16 gets a notification. This will start the power management process on the application processor 20.
2) The MCU 16 then transmits (signal 202) the CAN state to virtual machines (26, 28, 30) that are subscribed to a serial peripheral interface (SPI) dispatch service (that manages communications between hardware and software) and to the power management service 44 in the hypervisor 24. In FIG. 6 the application 32a within the telematics virtual machine 26 is shown receiving the transmission from the MCU 16.

3) Application 32a within virtual machine 26 decides, based on the transmission from the MCU, that it wants to go to a different local power state (and that consequently the vehicle controller 14 is to go to a new global power state). Application 32a requests (communication 204) the new power state to the power manager 48 in the hypervisor.

4) The power manager 48 triggers its internal state machine following the request from application 32a. The power manager 48 has also received the CAN bus state transmission from the MCU and so it knows the CAN bus is turned off and the vehicle is powered down. The new power state is accepted.

5) The power manager forwards (communication 206) the new power state to the virtual machine manager 46.

6) The virtual machine manager 46 manages the power lifecycle (via first control signal(s) 207) of the virtual machines as described below in order to transition the virtual machines 26, 28, 30 to the correct local power states corresponding to the new global power state.

7) Once all the virtual machines are in their correct local power states, the virtual machine manager 46 sends an acknowledgment communication 208 back to the power manager 48.

8) Upon receiving the acknowledgement communication 208, the power manager 48 sends a message to the MCU 16 to set the MCU in the correct power state.

9) Once the virtual machines 26, 28, 30 and the MCU are all in the correct power states, the power manager 48 sends a control signal 210 (a "second control signal") to the hypervisor OS 24 & drivers to suspend or shutdown the application processor 14.

Virtual Machine Manager

The virtual machine manager 46 is responsible for the lifecycle of the virtual machines 26, 28, 30. The virtual machine manager 46 monitors the state of the virtual machines, can start & stop them, and make sure they are all running correctly at any given time.

A virtual machine has three different power states (local power states) it can be in: active, shutdown or suspended. The vehicle controller 14 power management is focused around these three virtual machine states.

The vehicle controller 14 has different (global) power states and the virtual machine manager 46 has a configuration file 90 (shown in FIG. 6) that represents the information in Table 1 above and that maps the local power state of each virtual machine to a vehicle controller 14 global power state.

As discussed above, the virtual machine manager 46 has a virtual machine manager client (VMMC—56, 58, 60) process running in each of the virtual machines that serves as a local monitor.

An overview of the method of operation of the virtual machine manager 46 is as follows:

1) Once the power manager 48 has decided on a power state transition for the vehicle controller 14 (as a result of the process noted above in relation to FIG. 6), the power manager 48 sends the new power state to the virtual machine manager 46 over the controller 14 middleware layer (see communication 72 in FIG. 3).

2) The virtual machine manager 46, upon receipt of the power state transition from the power manager 48, checks the configuration file 90 and maps each virtual machine local power state to the new controller global power state.

3) The virtual machine manager 46 then sends, via a "first control signal" 207, the new local power state for each virtual machine individually to the respective VMM clients 56, 58, 60 (see control signals 207 in FIG. 6).

4) The VMM Clients in each virtual machine then manage the power state transition for their respective virtual machine. If one or more keep alive messages are active for a virtual machine 26, 28, 30, then the local power state for that virtual machine 26, 28, 30 is updated once all keep alive messages therefore have been cleared, or upon expiration of the timer 62 as described above. Taking virtual machine 26 as an example:

a. For a transition to the "shutdown" local power state, the VMM Client 56 will send a short warning (e.g. a few seconds) to the applications within the virtual machine 26 then shutdown the OS kernel and with it the entire virtual machine 26. The virtual machine manager 46 detects that the virtual machine has been shutdown and keeps track of it. Similar processes happen in each virtual machine.

b. For a transition to the "suspend" local power state, the VMM Client 56 will send a message to the virtual machine power management application (e.g. application 32a), the virtual machine (e.g. 26) will now suspend its activities & drivers, will handshake with the VMM Client 56 once it's ready to suspend, then the VMM Client sends a suspend command signal to the OS kernel. This will suspend the entire virtual machine 26. The virtual machine manager 46 detects that the virtual machine has been suspended and keeps track of it.

c. For a transition to the "active" local power state, if the virtual machine 26 is already running, nothing has to be done, otherwise the virtual machine manager 46 will start the virtual machine 26.

5) Once all the virtual machines have transitioned to their new local power states, the virtual machine manager 46 sends a message back to the power manager 48 to inform the power manager that the virtual machines are now in the correct state.

6) Upon receipt of the message in (6), the power manager 48 continues its power management activities as described above.

An overview of the method of changing a global power state of a vehicle controller 14 is shown in FIG. 7.

In step 300, a vehicle parameter signal 200 is received indicative of a required global power state of the vehicle controller 14 within the vehicle control system 12. In step 302, a local power state is determined for each virtual machine 26, 28, 30 in dependence on the received vehicle parameter signal 200 and the configuration file 90. In step 304 a current local power state of each virtual machine is updated to the respective determined local power state therefor. If one or more keep alive messages are active for a virtual machine 26, 28, 30, then the local power state for that virtual machine 26, 28, 30 is updated once all keep alive messages therefore have been cleared, or upon expiration of the timer 62 as described above. In step 306 a current global power state of the vehicle control system is updated to the required global power state.

Figure 8:
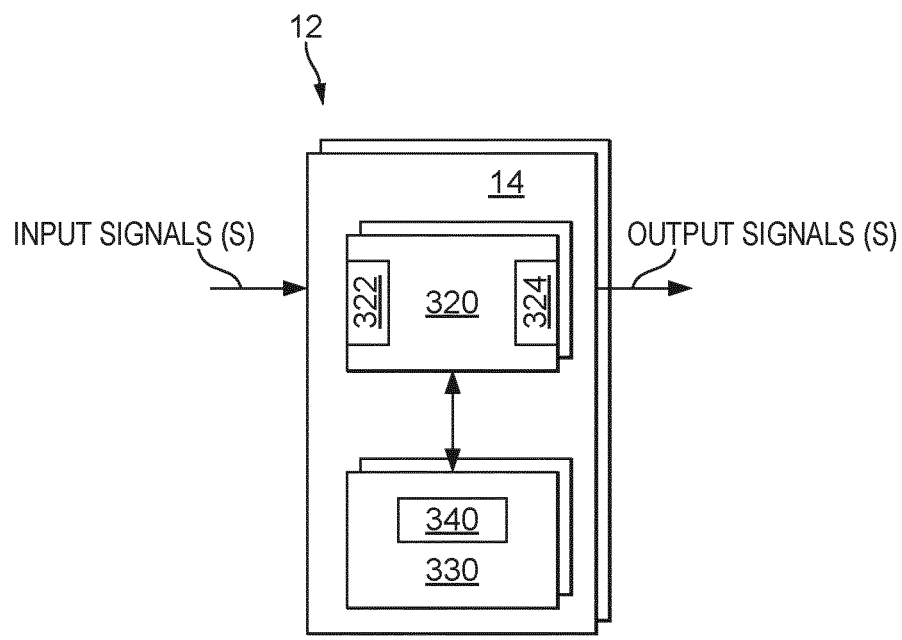
FIG. 8 shows a simplified example of a control system suitable for use with embodiments of the invention.

With reference to FIG. 8, there is illustrated a simplified example of a control system 12 such as may be adapted to implement the method of FIGS. 4 and 7 described above. The control system 12 comprises one or more controllers 14.

It is to be understood that the or each controller 14 can comprise a hypervisor 24 having one or more virtual machines. The controller 14 may comprise electronic processors (e.g., a microprocessor, a microcontroller, an application specific integrated circuit (ASIC), etc.), and may comprise a single control unit or computational device, or alternatively different functions of the or each controller 14 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 14 to implement the control techniques described herein (including some or all of the functionality required for the methods described herein). The set of instructions could be embedded in said one or more electronic processors of the controller 14; or alternatively, the set of instructions could be provided as software to be executed in the controller 14. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 8, the or each controller 14 comprises at least one electronic processor 320 having one or more electrical input(s) 322 for receiving one or more (input signal(s)), and one or more electrical output(s) 324 for outputting one or more (output signal(s)). The or each controller 14 further comprises at least one memory device 330 electrically coupled to the at least one electronic processor 320 and having instructions 340 stored therein. The at least one electronic processor 320 is configured to access the at least one memory device 330 and execute the instructions 340 thereon so as to control a power state of a vehicle controller 14.

The, or each, electronic processor 320 may comprise any suitable electronic processor (e.g., a microprocessor, a microcontroller, an ASIC, etc.) that is configured to execute electronic instructions. The, or each, electronic memory device 330 may comprise any suitable memory device and may store a variety of data, information, threshold value(s), lookup tables or other data structures, and/or instructions therein or thereon. In an embodiment, the memory device 330 has information and instructions for software, firmware, programs, algorithms, scripts, applications, etc. stored therein or thereon that may govern all or part of the methodology described herein. The processor, or each, electronic processor 320 may access the memory device 330 and execute and/or use that or those instructions and information to carry out or perform some or all of the functionality and methodology describe herein.

The at least one memory device 330 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 14 have been described comprising at least one electronic processor 320 configured to execute electronic instructions stored within at least one memory device 330, which when executed causes the electronic processor(s) 320 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The invention claimed is:

1. A vehicle controller comprising a hypervisor for controlling a power state of the vehicle controller, the vehicle controller comprising at least two virtual machines hosted on the vehicle controller, the hypervisor configured to:
   receive an active status indication from at least one virtual machine;
   determine, in dependence on the active status indication, if at least one virtual machine is active; and
   inhibit a reduced power state of the vehicle controller if the hypervisor determines that at least one virtual machine is active,
   wherein the hypervisor comprises a power manager wherein the power manager is configured to output a power state control signal to change the power state of the vehicle controller, and further wherein the hypervisor comprises a virtual machine manager, the virtual machine manager being configured, when at least one of the at least one virtual machine requires power, to output a power requirement signal to the power manager to inhibit the power manager from outputting the power state control signal to change the power state of the vehicle controller to the reduced power state.

2. The vehicle controller as claimed in claim 1, wherein the active status indication comprises a virtual machine identifier.

3. The vehicle controller as claimed in claim 1, wherein the virtual machine manager comprises a power status counter.

4. The vehicle controller as claimed in claim 3, wherein the power status counter comprises at least two power status counter values and wherein each power status counter value corresponds to a virtual machine hosted on the vehicle controller.

5. The vehicle controller as claimed in claim 4, wherein the power status counter value is altered for the at least one virtual machine that has sent the active status indication.

6. The vehicle controller as claimed in claim 5, wherein the active status indication comprises a positive power requirement message from one of the at least one virtual machine and the power status counter value for that virtual machine is configured to be increased in response to the positive power requirement message.

7. The vehicle controller as claimed in claim 5, wherein the active status indication comprises a negative power requirement message from one of the at least one virtual machine and the power status counter value for that virtual machine is configured to be decreased in response to the negative power requirement message.

8. The vehicle controller as claimed in claim 4, wherein the hypervisor is configured to initiate a timer upon receipt of the active status indication from the at least one virtual machine and wherein the hypervisor is configured to alter the power status counter value for the at least one virtual machine in dependence on the timer.

9. The vehicle controller as claimed in claim 8, wherein the timer is configured to reset the power status counter value to a datum point at expiration of the timer.

10. The vehicle controller as claimed in claim 1, wherein the active status indication is a keep alive request generated by one of the at least one virtual machine to indicate to the hypervisor that the virtual machine requires power.

11. The vehicle controller as claimed in claim 1, wherein each virtual machine comprises a plurality of applications, each application being configured to send active status indications.

12. The vehicle controller as claimed in claim 1, comprising:
   at least one electronic processor having an electrical input for receiving the active status indication; and
   at least one memory device electrically coupled to the at least one electronic processor and having instructions stored therein;
   and wherein the at least one electronic processor is configured to access the at least one memory device and execute the instructions thereon so as to inhibit the reduced power state of the vehicle controller if the hypervisor determines that at least one virtual machine is active.

13. The vehicle controller according to claim 1 comprised in a vehicle.

14. A vehicle controller comprising a hypervisor for controlling a power state of the vehicle controller, the vehicle controller comprising at least two virtual machines hosted on the vehicle controller, the hypervisor configured to:
   receive an active status indication from at least one virtual machine;
   determine, in dependence on the active status indication, if at least one virtual machine is active; and
   inhibit a reduced power state of the vehicle controller if the hypervisor determines that at least one virtual machine is active, wherein the hypervisor is configured to receive a shut-down request signal to change the power state of the vehicle controller from an ON state to the reduced power state and wherein the hypervisor is configured to output a power state control signal to transition the vehicle controller from the ON state to the reduced power state when the hypervisor determines that none of the at least one virtual machine require power.

15. A method of controlling a power state of a vehicle controller, the vehicle controller comprising at least two virtual machines hosted on the vehicle controller, the method comprising:
   receiving an active status indication from at least one virtual machine;
   determining, in dependence on the active status indication, if at least one virtual machine is active;
   inhibiting a reduced power state of the vehicle controller if a hypervisor determines that at least one virtual machine is active; and
   determining which virtual machine sent the active status indication and varying a power status counter value corresponding to the at least one virtual machine in response to receiving a power requirement message.

16. The method as claimed in claim 15, further comprising determining if any of the at least one virtual machine require power comprises by comparing the power status counter value with a datum point.

17. A non-transitory computer readable medium comprising computer readable instructions that, when executed by a processor, cause performance of the method of claim 15.

* * * * *